United States Patent [19]
Rauch

[11] Patent Number: 5,537,252
[45] Date of Patent: Jul. 16, 1996

[54] DOUBLE BLAZED BINARY DIFFRACTION OPTICAL ELEMENT BEAM SPLITTER

[75] Inventor: Russell B. Rauch, Pasadena, Calif.

[73] Assignee: Xerox Corporation, Stamford, Conn.

[21] Appl. No.: 172,357

[22] Filed: Dec. 23, 1993

[51] Int. Cl.[6] .............................. G02B 5/08; H04J 14/00
[52] U.S. Cl. ........................ 359/569; 359/571; 359/117
[58] Field of Search ................................ 359/566, 569, 359/571, 558, 565, 621, 622, 639, 640, 117, 124, 576; 385/17, 37

[56] References Cited

U.S. PATENT DOCUMENTS

| | | | |
|---|---|---|---|
| 3,900,264 | 8/1975 | Heitmann et al. | 356/111 |
| 4,146,783 | 3/1979 | DesBois et al. | 359/566 |
| 4,257,673 | 3/1981 | Matthijsse | 359/569 |
| 4,552,435 | 11/1985 | von Bieren | 359/571 |
| 4,560,249 | 12/1985 | Nishiwaki et al. | 359/569 |
| 4,679,901 | 7/1987 | Dammann et al. | 359/571 |
| 4,895,790 | 1/1990 | Swanson et al. | 430/321 |
| 4,966,446 | 10/1990 | Huang et al. | 359/571 |
| 4,982,395 | 1/1991 | MacAnally | 369/44.37 |
| 5,013,141 | 5/1991 | Sakata | 359/62 |
| 5,073,007 | 12/1991 | Kedmi et al. | 359/565 |
| 5,182,610 | 1/1993 | Shibata | 356/349 |
| 5,227,915 | 7/1993 | Grossinger et al. | 359/565 |
| 5,271,078 | 12/1993 | Franz et al. | 385/37 |
| 5,311,345 | 5/1994 | Cloonan et al. | 359/117 |
| 5,315,423 | 5/1994 | Hong | 359/124 |
| 5,414,540 | 5/1995 | Patel et al. | 359/39 |
| 5,477,383 | 12/1995 | Jain | 359/565 |

OTHER PUBLICATIONS

S. T. Peng, et al., "Directional Blazing of Waves Guided by Asymmetrical Dielectric Gratings", *Optics Communications*, vol. 11, No. 4, Aug. 1974.
A. Kathman & E. Johnson, "Binary Optics: New Diffractive Elements for the Designer's Tool Kit", *Photonics Spectra*, Sep. 1992, pp. 125–129.
W. Veldkamp & T. McHugh, "Binary Optics", *Scientific American*, vol. 266, No. 5, May 1992, pp. 92–97.
G. J. Swanson, "Binary Optics Technology: The Theory and Design of Multi–Level Diffractive Optical Elements", Lincoln Laboratory, Massachusetts Institute of Technology, Technical Report 854, 14 Aug. 1989.

Primary Examiner—Paul M. Dzierzynski
Assistant Examiner—John Juba, Jr.
Attorney, Agent, or Firm—William Propp

[57] ABSTRACT

A double blazed binary diffractive optical element beam splitter having alternating and opposing individual blazed diffraction gratings upon a multilevel surface relief phase grating structure for splitting an incident monochromatic light beam into a first and second diffracted light beams. The double blazed binary diffractive optical element and two single blazed binary diffractive optical elements can form either a beam splitting apparatus or a beam combining apparatus. Double blazed binary diffractive optical elements and sets of two single blazed binary diffractive optical elements can form beam splitting and combining apparatuses to produce a single beam or two closely spaced beams.

15 Claims, 4 Drawing Sheets

DOUBLE BLAZED BINARY DIFFRACTION OPTICAL ELEMENT BEAM SPLITTER

BACKGROUND OF THE INVENTION

This invention relates to a binary diffractive optical element, and, more particularly, to a double blazed binary diffractive optical element which functions as a beam splitter.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle into some given diffraction order is referred to as the diffraction efficiency for that order. The diffraction efficiency of a diffractive element is determined by the element's surface profile. If the light that is not redirected by the desired angle is substantial, the result will be an intolerable amount of scatter in the image or output plane of the optical system.

Theoretically, on-axis diffractive phase elements consisting of a grating having a given period can achieve 100 percent diffraction efficiency. To achieve this efficiency, however, a continuous phase profile within any given period is necessary. The theoretical diffraction efficiency of this surface profile is also relatively sensitive to a change in wavelength. By contrast, refractive elements are relatively wavelength insensitive. The technology for producing high quality, high efficiency, continuous phase profiles of the diffraction does not presently exist.

A compromise that results in a relatively high diffraction efficiency and ease of fabrication is a multi-level phase grating. The larger the number of discrete phase levels, the better the approximation of the continuous phase function. The multi-level phase surface profiles of the grating can be fabricated using standard semiconductor integrated circuit fabrication techniques.

As disclosed in *Binary Optics Technology: The Theory and Design of Multi-level Diffractive Optical Elements* by G. J. Swanson of the Lincoln Laboratory at the Massachusetts Institute of Technology, (Technical Report 854, 14 Aug. 1989), herewithin incorporated by reference, and the resulting U.S. Pat. No. 4,895,790, a fabrication process starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material, such as glass, Ge, ZnSe, Si, GaAs, and $SiO_2$, is coated with a thin layer of photoresist. A first lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary surface relief phase grating.

The process may be repeated using a lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process may be repeated a third and fourth time with lithographic masks having periods of one-quarter and one-eighth that of the first mask, and etching the substrates to depths of one-quarter and one-eighth that of the first etch. The successive etches result in elements having 8 and 16 phase levels. More masks than four might be used, however, fabrication errors tend to predominate as more masks are used.

This process produces a multilevel surface relief grating structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. The process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

A number of beam splitting means are known in the art. Partially silvered mirrors or partially silvered prisms can be used to create multiple beams by separating the incident beam into a reflective beam and a transmitted beam. However, a substantial portion of the incident beam may be lost to absorption and not split, transmittance/reflectance beam splitters are usually not efficient. Dielectric and dichroic films may also be used as beam splitters. However, a constant uniform thickness in the micron range is needed for such film beam splitters. Current technology can use single crystals, particularly calcite crystals, as beam splitters and beam combiners. However, these crystals cannot be artificially grown, which limits their availability and ability to be mass reproduced.

The advantages of a beam splitter formed from a binary diffractive optical element are the low cost and compact substrate of a binary diffractive optical element. The binary diffractive optical element beam splitter can be fabricated using photolithography techniques. The binary diffractive optical element beam splitter can be batch processed and coated with any necessary anti-reflective coatings upon a single substrate and subsequently diced into individual elements. The beam splitting and beam combining of a binary diffractive optical element only depend upon the grating period and the wavelength of light.

It is an object of this invention to provide a binary diffractive optical element which functions as a beam splitter.

It is yet another object of this invention to provide a binary diffractive optical element which functions as a beam combiner.

SUMMARY OF THE INVENTION

In accordance with the present invention, a double blazed binary diffractive optical element beam splitter having alternating and opposing individual blazed diffraction gratings upon a multilevel surface relief phase grating structure for splitting an incident monochromatic light beam into a first and second diffracted light beams. The double blazed binary diffractive optical element and two single blazed binary diffractive optical elements can form either a beam splitting apparatus or a beam combining apparatus. Double blazed binary diffractive optical elements and sets of two single blazed binary diffractive optical elements can form beam splitting and combining apparatuses to produce a single beam or two closely spaced beams.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
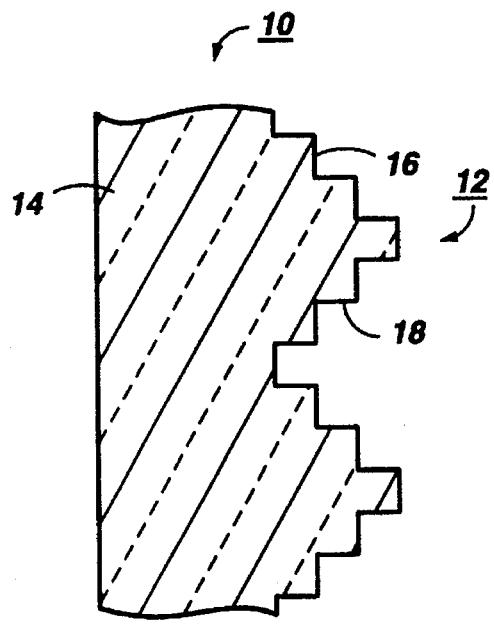
FIG. 1 is a schematic illustration of the cross-section side view of a double blazed binary diffractive optical element beam splitter formed according to the present invention.

Reference is now made to FIG. 1, wherein there is illustrated a double blazed binary diffractive optical element beam splitter 10 for splitting an incident monochromatic beam into two first order diffracted beams. The binary diffractive optical element 10, that of a double blazed grating, has a surface relief phase grating structure 12 on a substrate 14. In this illustrative example, the surface relief phase grating structure 12 is a sixteen level surface relief phase grating structure so that the diffraction efficiency is approximately 30 percent net throughput for each beam (instead of 50 percent), since the doubly blazed grating produces higher diffracted orders in each beam which are blocked by stops.

The individual blazed grating grooves 16 alternate with and are opposed to the individual blazed grating grooves 18 to form the surface relief phase grating structure 12. The individual blazed grating grooves 16 and 18 of the surface relief phase grating structure 12 of the binary diffractive optical element 10 have the same grating period P and a depth D.

A single blazed diffractive optical element will diffract incident light into a single order, according to the wavelength and grating depth. The other diffraction orders and the undiffracted zero order transmitted beam will be suppressed so that the diffracted light is all in a single order. When the grating blaze is approximated by a series of binary steps, the performance of the resulting binary diffractive optical element approximates that of the diffractive element according to well-known relationships.

The optimum maximum depth, $d_0$, for the deepest phase level or groove in the binary diffractive optical element will be $$d_0 = \lambda/(n-1) \qquad \text{Equation 1}$$

where $\lambda$ is the wavelength of the incident light beam and n is the index of refraction of the optical substrate 14.

When the groove depth is at the optimum maximum depth, $d_0$, of Equation 1, then the diffractive efficiency is 100 percent. All of an incident beam will be diffracted into the first order beam by the binary diffractive optical element. None of the incident light beam would be transmitted through the binary diffractive optical element as an undiffracted, zero order beam. The binary diffractive optical element is a blazed grating. The depth, D, of the individual gratings 16 and 18 is this optimum maximum depth, $d_0$, so that the individual gratings 16 and 18 are blazed gratings.

Figure 2:
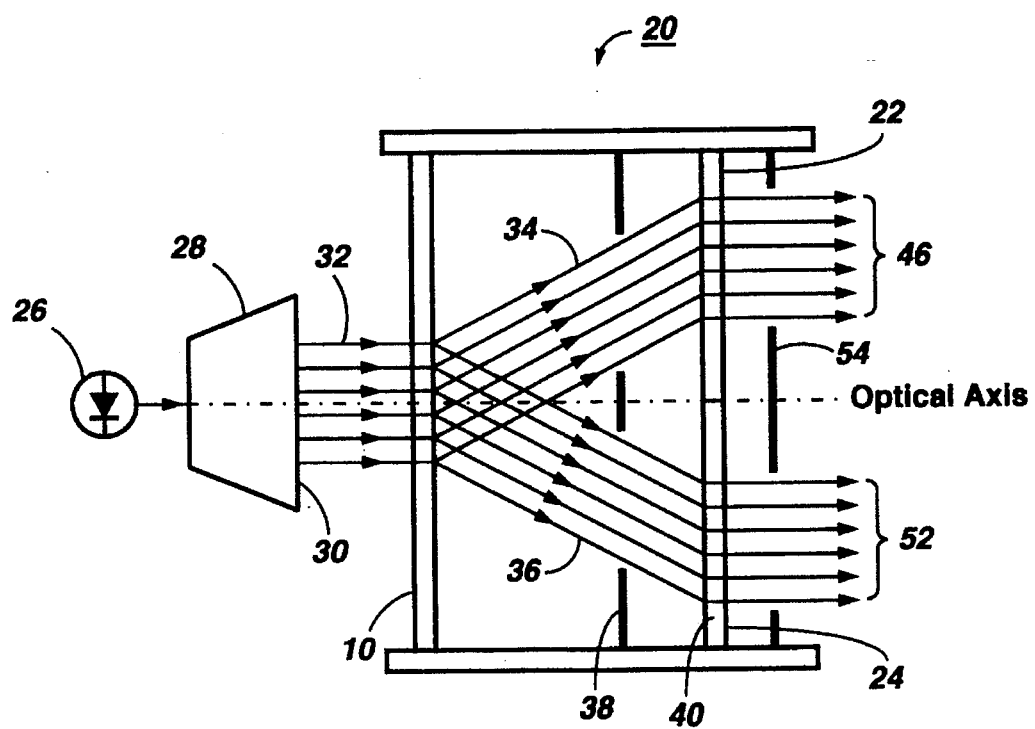
FIG. 2 is a schematic illustration of the cross-section side view of a binary diffractive optical element beam splitter apparatus for splitting an incident light beam into two separate light beams according to the present invention.

As shown in FIG. 2, the beam splitting apparatus 20 will consist of the double blazed binary diffractive optical element beam splitter 10 and two single blazed binary diffractive optical elements 22 and 24. A laser source 26 will emit a beam 28 of a single wavelength which is collimated by collimator 30. The collimated beam 32 is then incident upon the double blazed binary diffractive optical element beam splitter 10. The beam can be modulated by means not shown.

The blazed diffraction gratings 16 and 18 of the double blazed surface relief phase grating structure 12 will split the incident beam 32 into two light beams 34 and 36 of equal intensity. Double blaze patterns are symmetrical. Other splitting ratios can be obtained by suitable design of non-symmetrical blaze patterns. The blazed grating grooves 16 will diffract the incident beam into the first order diffracted beam 36 and the blazed grating grooves 18 will diffract the incident beam into first order diffracted beam 34. The blazed grating grooves will also diffract light into higher order diffraction beams which will be blocked by stops and are not shown in the Figure.

Since the blazed grating grooves 16 and 18 are symmetrically alternating and have the same period, each blazed grating will receive half the incident light beam. Since the depth of the blazed gratings was determined by the wavelength of the incident light beam and the index of refraction of the substrate, nearly all of the light beam will be diffracted into the first order diffracted beam and the higher order diffracted beams by the blazed grating grooves. Thus, the blazed diffraction grating grooves 16 and 18 of the double blazed surface relief phase grating structure 12 of the binary diffractive optical element beam splitter 10 will diffract the incident beam into two beams of equal intensity, each beam with approximately 30 percent of the intensity of the single incident beam 32.

The first order diffracted split light beams 34 and 36 propagate at equal but opposite angles from the optical axis of the incident beam. A stop 38 can block the higher order diffracted beams and any stray light beams other than the primary split light beams 34 and 36.

The angle θ by which the light beams 34 and 36 are diffracted is dependent upon the wavelength $\lambda$ and the grating period P where $$\sin \theta = \lambda/P \qquad \text{Equation 2}$$

where $\lambda$ is the wavelength of the incident light beam 32 and P is the grating period of the individual grating grooves of the surface relief phase grating structure 12.

Figure 3:
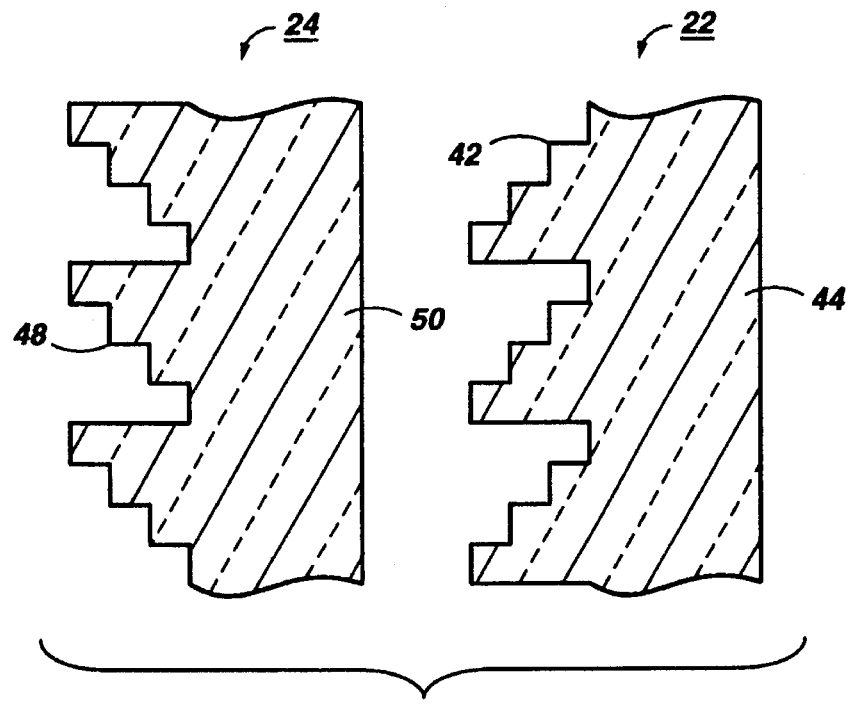
FIG. 3 is a schematic illustration of the cross-section side view of the two single blazed binary diffractive optical elements of FIG. 2 formed according to the present invention.

The two single blazed binary diffractive optical elements 22 and 24 are typically on a common substrate 40. The single blazed binary diffractive optical element 22 as shown in FIG. 3 has a surface relief phase grating structure 42 on a substrate 44. The single blazed binary diffractive optical element 22 has the same grating period P and a depth D as the individual blazed grating grooves 18 of the surface relief phase grating structure 12 of the binary diffractive optical element 10. The single blazed binary diffractive optical element 22 is the inverse of the individual blazed grating grooves 18. The surface relief phase grating structure of the binary diffractive optical element beam splitter 10 is on the output side of the binary diffractive optical element. Incident light passes through the substrate 14 before being diffracted by the relief phase grating structure 16 on the surface. The surface relief phase grating structure 42 of the binary diffractive optical element 22 is on the incident side of the binary diffractive optical element. Incident light is diffracted by the relief phase grating structure 42 on the surface before passing through the substrate 44.

Thus, returning to FIG. 2, diffracted light beam 34 from individual blazed grating grooves 18 of the binary diffractive optical element beam splitter 10 will be diffracted by single blazed binary diffractive optical element 22 into first order diffracted beam 46.

Similarly, the single blazed binary diffractive optical element 24 as shown in FIG. 3 has a surface relief phase grating structure 48 on a substrate 50. The single blazed binary diffractive optical element 24 has the same grating period P and a depth D as the individual blazed grating grooves 16 of the surface relief phase grating structure 12 of the binary diffractive optical element 10. The single blazed binary diffractive optical element 24 is the inverse of the individual blazed grating grooves 16. The surface relief phase grating structure of the binary diffractive optical element beam splitter 10 is on the output side of the binary diffractive optical element. Incident light passes through the substrate 14 before being diffracted by the relief phase grating structure 18 on the surface. The surface relief phase grating structure 48 of the binary diffractive optical element 24 is on the incident side of the binary diffractive optical element. Incident light is diffracted by the relief phase grating structure 48 on the surface before passing through the substrate 50. The two single blazed binary diffractive optical elements 22 and 24 are opposite.

Thus, returning to FIG. 2, diffracted light beam 36 from individual blazed grating grooves 16 of the binary diffractive optical element beam splitter 10 will be diffracted by single blazed binary diffractive optical element 24 into first order diffracted beam 52.

The diffracted light beams 46 and 52 are parallel to each other and to the incident light beam 32. A stop 54 can block any stray light other than the first order diffracted split light beams 46 and 52. The two diffracted light beams 46 and 52 also remain collimated since the grating period of the various binary optical elements in their light path is constant. From Equation 2, there is no angular deviation if the wavelength of the light beam and the period of the gratings remain constant.

Figure 4:
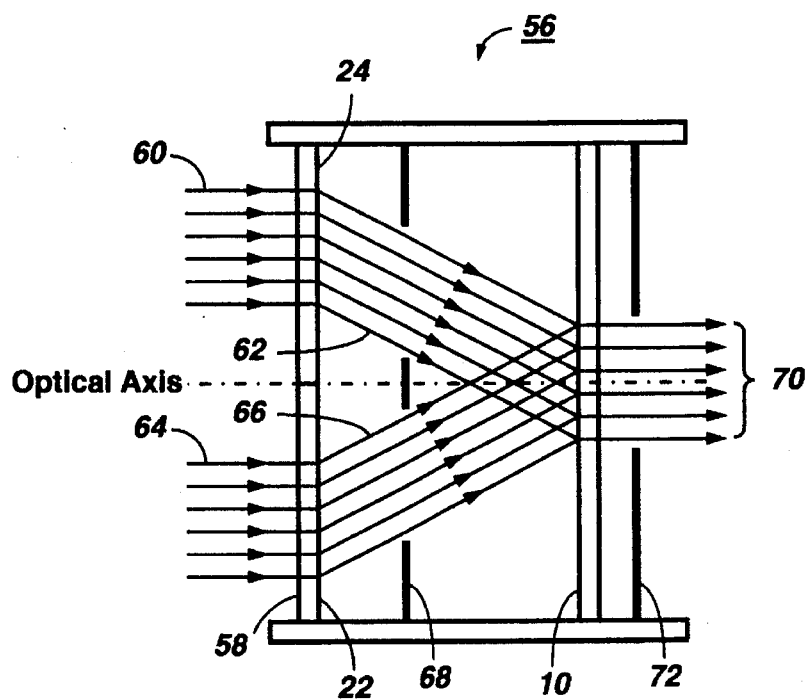
FIG. 4 is a schematic illustration of the cross-section side view of a binary diffractive optical element beam combiner apparatus for combining two separate incident light beams into a single light beam according to the present invention.

The two single blazed binary diffractive optical elements 22 and 24 and the double blazed binary diffractive optical element 10 can form a beam combining apparatus 56 of FIG. 4.

The two single blazed binary diffractive optical elements 22 and 24 are on a common substrate 58. The two single blazed binary diffractive optical elements 22 and 24 in the beam combiner apparatus are on opposite sides of the optical axis from their positions in the beam splitting apparatus.

Collimated light beam 60 is incident upon the single blazed binary diffractive optical element 24 and will be diffracted into first order diffracted beam 62. Collimated light beam 64 is incident upon the single blazed binary diffractive optical element 22 and will be diffracted into first order diffracted beam 66. Light beams 60 and 64 are parallel and on opposite sides of the optical axis. Light beams 60 and 64 also have the same wavelength.

Diffracted beams 62 and 66 propagate at equal angles toward the optical axis but also at opposite angles from the optical axis. A stop 68 can block any stray light other than the diffracted light beams 62 and 66.

The angle θ by which the light beams 62 and 66 are diffracted is dependent upon the wavelength of the incident light beams 60 and 64 and the grating pitch, p, of the individual grating grooves of the two single blazed binary diffractive optical elements 22 and 24 as set forth in Equation 2.

The two diffracted beams 62 and 66 converge, overlap and are then diffracted by the double blazed binary diffractive optical element 10 into a single combined light beam 70. The blazed grating grooves 16 will diffract the incident diffracted light beam 62 from single blazed diffractive optical element 16 into a portion of the first order diffracted light beam 70. Similarly, the blazed grating grooves 18 will diffract the incident diffracted light beam 66 from single blazed diffractive optical element 22 into a portion of the first order diffracted light beam 70. A stop 72 can block any higher diffraction order beams from the double blazed diffractive optical element 10 or any stray light other than the diffracted combined light beam 70.

The surface relief phase grating structure of the binary diffractive optical element 22 and 24 are on the output side while the surface relief phase grating structure of the binary diffractive optical element beam splitter 10 is on the incident side in the beam combining apparatus 56.

Figure 5:
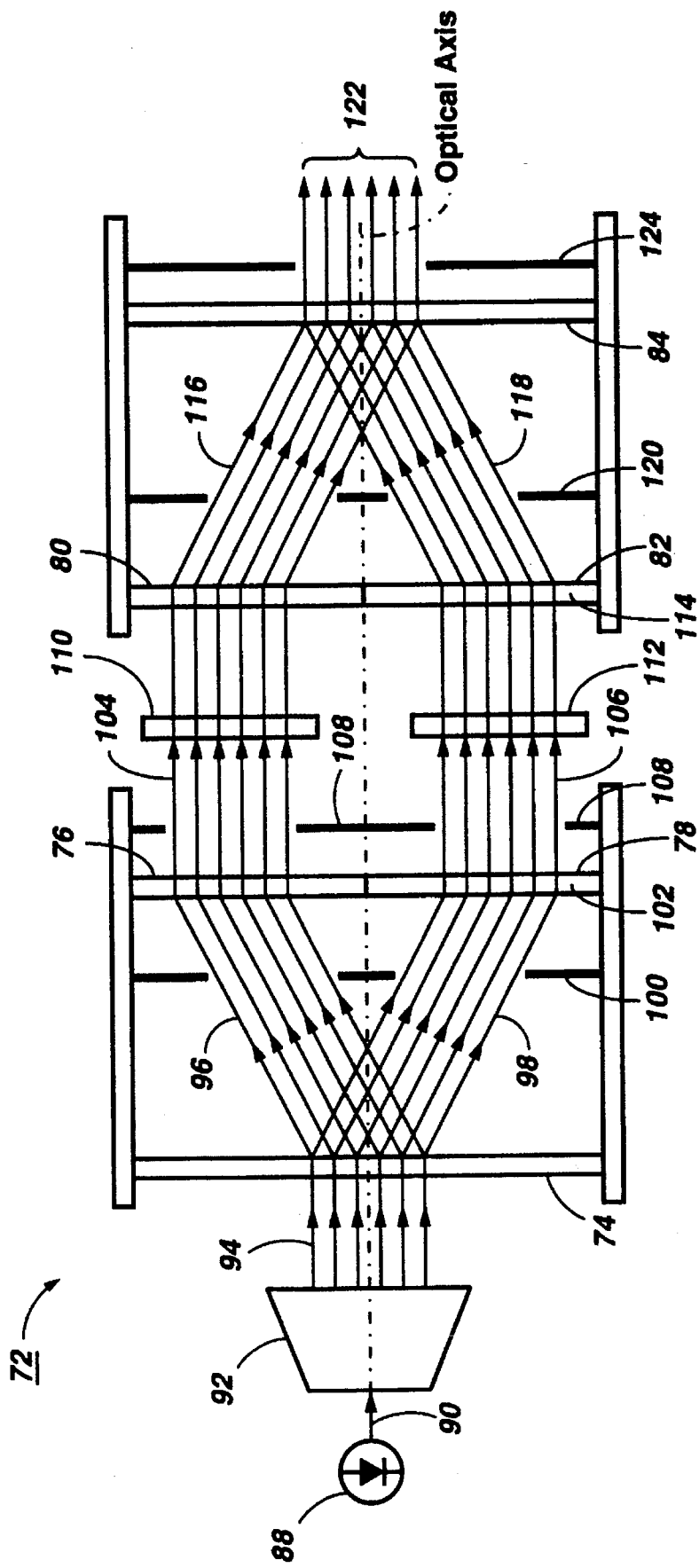
FIG. 5 is a schematic illustration of a binary diffractive optical element beam splitter and combiner apparatus for splitting an incident light beam into two separate light beams and combining the two separate light beams into a single light beam according to the present invention.

The beam splitting apparatus 20 of FIG. 2 and the beam combining apparatus 56 of FIG. 4 can be integrated to form the binary diffractive optical element beam splitter and combiner apparatus 72 of FIG. 5 for splitting an incident light beam into two separate light beams and combining the two separate light beams into a single light beam.

The binary diffractive optical element beam splitter and combiner apparatus 72 will consist of a first double blazed binary diffractive optical element 74, a first set of two single blazed binary diffractive optical elements 76 and 78, a second set of two single blazed binary diffractive optical elements 80 and 82 and a second double blazed binary diffractive optical element 84.

A laser source 88 will emit a beam 90 of a single wavelength which is collimated by collimator 92. The collimated beam 94 is then incident upon the double blazed binary diffractive optical element 74, acting as a beam splitter.

The blazed diffraction grating grooves of the binary diffractive optical element 74 will split the incident beam 94 into two light beams 96 and 98 of equal intensity.

The first order diffracted split light beams 96 and 98 propagate at equal but opposite angles from the optical axis of the incident beam. A stop 100 can block the higher order diffracted beams and any stray light beams other than the primary split light beams 96 and 98.

The first set of two single blazed binary diffractive optical elements 76 and 78 are typically on a common substrate 102. The single blazed binary diffractive optical element 76 is the inverse of the optically corresponding individual blazed grating grooves on the double blazed binary diffractive optical element 74. The diffracted light beam 96 from the blazed grating grooves of the double blazed binary diffractive optical element 74 will be diffracted by the single blazed binary diffractive optical element 22 into first order diffracted beam 104.

The single blazed binary diffractive optical element 78 is the inverse of the optically corresponding individual blazed grating grooves on the double blazed binary diffractive optical element 74. The diffracted light beam 98 from the blazed grating grooves of the double blazed binary diffractive optical element 74 will be diffracted by the single blazed binary diffractive optical element 78 into first order diffracted beam 106.

The diffracted light beams 104 and 106 are parallel to each other and to the incident light beam 94. A stop 108 can block any stray light other than the first order diffracted split light beams 104 and 106.

The light beam 104 can then pass through an optical modulation means 110, such as a modulator or other device for effecting the phase, amplitude, polarization or other optical properties of the light beam. The light beam 106 can then pass through an optical modulation means 112, such as a modulator or other device for effecting the phase, amplitude, polarization or other optical properties of the light beam. Neither, either or both beams 104 and 106 can be optically modulated.

The second set of two single blazed binary diffractive optical elements 80 and 82 are on a common substrate 114. The single blazed binary diffractive optical element 80 is the inverse of the single blazed binary diffractive optical element 76, just as the single blazed binary diffractive optical element 82 is the inverse of the single blazed binary diffractive optical element 78.

The light beam 104 is incident upon the single blazed binary diffractive optical element 80 and will be diffracted into first order diffracted beam 116. Light beam 106 is incident upon the single blazed binary diffractive optical element 82 and will be diffracted into first order diffracted beam 118.

Diffracted beams 116 and 118 propagate at equal angles toward the optical axis but also at opposite angles from the optical axis. A stop 120 can block any stray light other than the diffracted light beams 116 and 118.

The two diffracted beams 116 and 118 converge, overlap and are then diffracted by the second double blazed binary diffractive optical element 84 into a single combined light beam 122. The second double blazed binary diffractive optical element 84 is identical to, but on the opposite side of the incident beam from, the first double blazed binary diffractive optical element 74.

The blazed grating grooves of the second double blazed binary diffractive optical element 84 will diffract the incident diffracted light beam 116 from single blazed diffractive optical element 80 into a portion of the first order diffracted light beam 122. Similarly, the other blazed grating grooves of the second double blazed binary diffractive optical element 80 will diffract the incident diffracted light beam 118 from single blazed diffractive optical element 82 into a portion of the first order diffracted light beam 122. A stop 124 can block any stray light other than the diffracted combined light beam 122.

The first double blazed binary diffractive optical element is the inverse of the first set of two single blazed binary diffractive optical elements. The second double blazed binary diffractive optical elements is the inverse of the second set of two single blazed binary diffractive optical elements. However, the first double blazed binary diffractive optical element need not be the inverse of the second double blazed binary diffractive optical element and the first set of two single blazed binary diffractive optical elements need not be the inverse of the second set of two single blazed binary diffractive optical elements.

Figure 6:
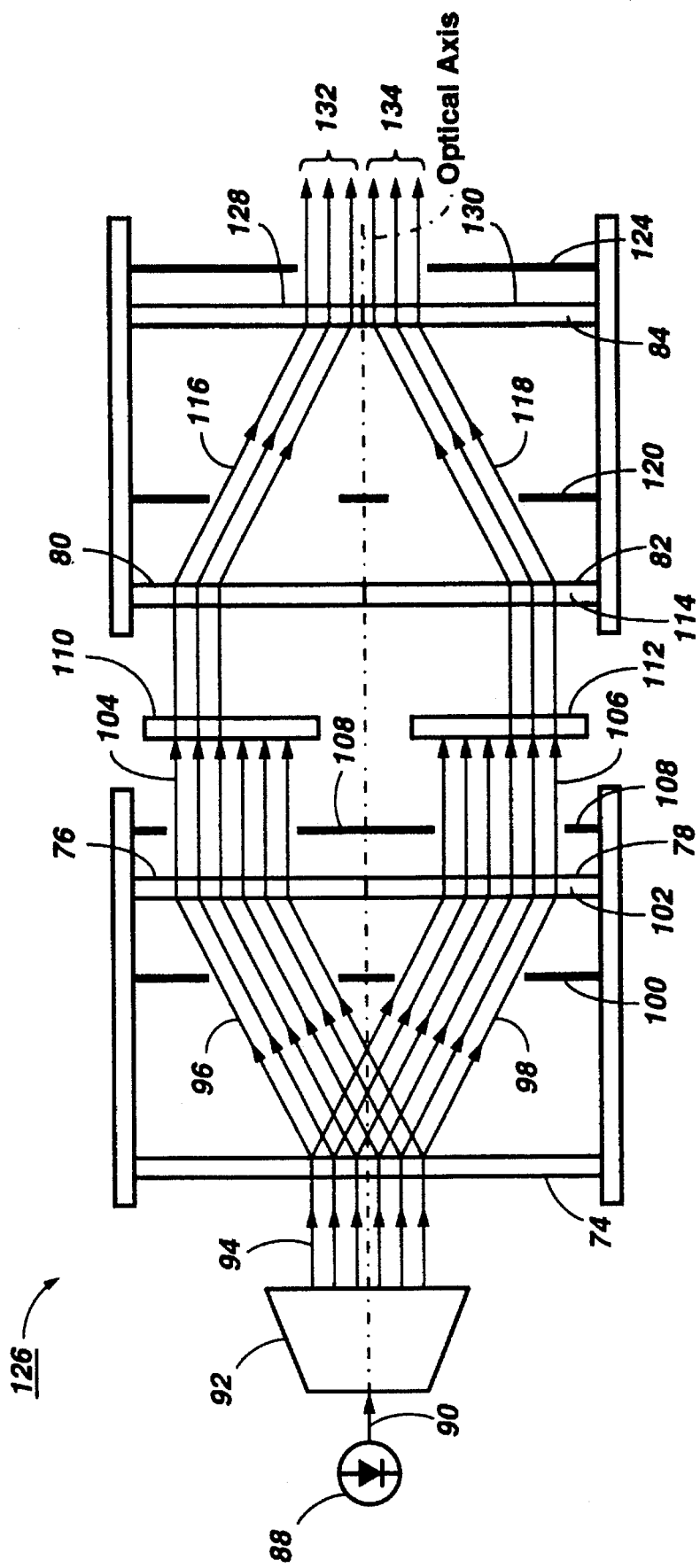
FIG. 6 is a schematic illustration of a binary diffractive optical element beam splitter and combiner apparatus for splitting an incident light beam into two separate light beams and combining the two separate light beams into a two separate closely spaced beams according to the present invention.

The binary diffractive optical element beam splitter and combiner apparatus 126 of FIG. 6 is identical to the binary diffractive optical element beam splitter and combiner apparatus 72 of FIG. 5 except the second double blazed binary diffractive optical element has been replaced by a third set of two single blazed binary diffractive optical elements 128 and 130 and the single combined output light beam is two separate, closely spaced, parallel beams 132 and 134.

The optical operation of the binary diffractive optical element beam splitter and combiner apparatus 126 of FIG. 6 is the same as that of the binary diffractive optical element beam splitter and combiner apparatus 72 of FIG. 5 until the two diffracted beams 116 and 118, from the second set of two single blazed binary diffractive optical elements 80 and 82, converge but do not overlap. Instead, diffracted beam 116 is diffracted by single blazed binary diffractive optical element 128 into first order diffracted beam 132. Diffracted beam 118 is diffracted by single blaze blazed binary diffractive optical element 130 into first order diffracted beam 134. Single blazed binary diffractive optical element 128 is the inverse of single blazed diffractive optical element 80 and single blazed binary diffractive optical element 130 is the inverse of single blazed diffractive optical element 82. Beams 132 and 134 are closely spaced, separate and parallel to each other, parallel to beams 104 and 106 and incident beam 94.

The beam splitters need not split the beam into two beams of equal intensity and the beam combiners need not combine two beams of equal intensity. The diffracted beams need not be parallel to each other or to the indident beam or beams.

The initial incident beam or beams can be modulated.

The substrates can be formed from glass, gallium arsenide, zinc selenide, germanium or quartz, for example.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A beam splitting and beam combining apparatus comprising a first double blazed binary diffractive optical element beam splitter having a multilevel surface relief phase grating structure upon an optical substrate, said multilevel surface relief phase grating structure having alternating individual blazed diffraction gratings with opposite blazing for splitting an incident monochromatic light beam into a first diffracted light beam and a second diffracted light beam, a first single blazed binary diffractive optical element having a multilevel surface relief phase grating structure upon an optical substrate, said multilevel surface relief phase grating structure having individual blazed diffraction gratings for diffracting said first diffracted light beam from said double blazed binary diffractive optical element beam splitter into a first double diffracted light beam, a second single blazed binary diffractive optical element having a multilevel surface relief phase grating structure upon an optical substrate, said multilevel surface relief phase grating structure having individual blazed diffraction gratings for diffracting said second diffracted light beam from said double blazed binary diffractive optical element beam splitter into a second double diffracted light beam, a third single blazed binary diffractive optical element having a multilevel surface relief phase grating structure upon an optical substrate, said multilevel surface relief phase grating structure having individual blazed diffraction gratings for diffracting said first double diffracted light beam from said first single blazed binary diffractive optical element into a first thrice diffracted light beam, a fourth single blazed binary diffractive optical element having a multilevel surface relief phase grating structure upon an optical substrate, said multilevel surface relief phase grating structure having individual blazed diffraction gratings for diffracting said second double diffracted light beam from said second single blazed binary diffractive optical element into a second thrice diffracted light beam, and a second double blazed binary diffractive optical element beam splitter having a multilevel surface relief phase grating structure upon an optical substrate, said multilevel surface relief phase grating structure having alternating individual blazed diffraction gratings with opposite blazing for combining said first thrice diffracted light beam from said third single blazed binary diffractive optical element and said second thrice diffracted light beam from said fourth single blazed binary diffractive optical element into a single light beam.

2. The beam splitting and beam combining apparatus of claim 1 further comprising optical means for modulating said first double diffracted light beam.

3. The beam splitting and beam combining apparatus apparatus of claim 1 further comprising optical means for modulating said second double diffracted light beam.

4. The beam splitting and beam combining apparatus apparatus of claim 1 further comprising first optical means for modulating said first double diffracted light beam and second optical means for modulating said second double diffracted light beam.

5. The beam splitting and beam combining apparatus apparatus of claim 1 wherein said first single blazed binary diffractive optical element and said second single blazed binary diffractive optical element have the same substrate.

6. The beam splitting and beam combining apparatus apparatus of claim 1 wherein said third single blazed binary diffractive optical element and said fourth single blazed binary diffractive optical element have the same substrate.

7. The beam splitting and beam combining apparatus apparatus of claim 1 wherein said first single blazed binary diffractive optical element and said second single blazed binary diffractive optical element have a first substrate and said third single blazed binary diffractive optical element and said fourth single blazed binary diffractive optical element have a second substrate.

8. A beam splitting and beam combining apparatus comprising a double blazed binary diffractive optical element beam splitter having a multilevel surface relief phase grating structure upon an optical substrate, said multilevel surface relief phase grating structure having alternating individual blazed diffraction gratings with opposite blazing for splitting an incident monochromatic light beam into a first diffracted light beam and a second diffracted light beam, a first single blazed binary diffractive optical element having a multilevel surface relief phase grating structure upon an optical substrate, said multilevel surface relief phase grating structure having individual blazed diffraction gratings for diffracting said first diffracted light beam from said double blazed binary diffractive optical element beam splitter into a first double diffracted light beam, a second single blazed binary diffractive optical element having a multilevel surface relief phase grating structure upon an optical substrate, said multilevel surface relief phase grating structure having individual blazed diffraction gratings for diffracting said second diffracted light beam from said double blazed binary diffractive optical element beam splitter into a second double diffracted light beam, a third single blazed binary diffractive optical element having a multilevel surface relief phase grating structure upon an optical substrate, said multilevel surface relief phase grating structure having individual blazed diffraction gratings for diffracting said first double diffracted light beam from said first single blazed binary diffractive optical element into a first thrice diffracted light beam, a fourth single blazed binary diffractive optical element having a multilevel surface relief phase grating structure upon an optical substrate, said multilevel surface relief phase grating structure having individual blazed diffraction gratings for diffracting said second double diffracted light beam from said second single blazed binary diffractive optical element into a second thrice diffracted light beam, a fifth single blazed binary diffractive optical element having a multilevel surface relief phase grating structure upon an optical substrate, said multilevel surface relief phase grating structure having individual blazed diffraction gratings for diffracting said first thrice diffracted light beam from said third single blazed binary diffractive optical element into a first quadruple diffracted light beam, and a sixth single blazed binary diffractive optical element having a multilevel surface relief phase grating structure upon an optical substrate, said multilevel surface relief phase grating structure having individual blazed diffraction gratings for diffracting said second thrice diffracted light beam from said fourth single blazed binary diffractive optical element into a second quadruple diffracted light beam, wherein said first quadruple diffracted light beam and said second quadruple diffracted light beam are closely spaced.

9. The beam splitting and beam combining apparatus apparatus of claim 8 further comprising optical means for modulating said first double diffracted light beam.

10. The beam splitting and beam combining apparatus apparatus of claim 8 further comprising optical means for modulating said second double diffracted light beam.

11. The beam splitting and beam combining apparatus apparatus of claim 8 further comprising first optical means for modulating said first double diffracted light beam and second optical means for modulating said second double diffracted light beam.

12. The beam splitting and beam combining apparatus apparatus of claim 8 wherein said first single blazed binary diffractive optical element and said second single blazed binary diffractive optical element have the same substrate.

13. The beam splitting and beam combining apparatus apparatus of claim 8 wherein said third single blazed binary diffractive optical element and said fourth single blazed binary diffractive optical element have the same substrate.

14. The beam splitting and beam combining apparatus apparatus of claim 8 wherein said fifth single blazed binary diffractive optical element and said sixth single blazed binary diffractive optical element have the same substrate.

15. The beam splitting and beam combining apparatus apparatus of claim 8 wherein said first single blazed binary diffractive optical element and said second single blazed binary diffractive optical element have a first substrate, said third single blazed binary diffractive optical element and said fourth single blazed binary diffractive optical element have a second substrate, and said fifth single blazed binary diffractive optical element and said sixth single blazed binary diffractive optical element have a third substrate.

* * * * *